(12) United States Patent
Yehuda et al.

(10) Patent No.: US 8,024,772 B1
(45) Date of Patent: Sep. 20, 2011

(54) APPLICATION SERVICE POLICY COMPLIANCE SERVER

(75) Inventors: Hanna Yehuda, Newton, MA (US); Amanuel Ronen Artzi, Framingham, MA (US); Ju-Lien Lim, Reading, MA (US)

(73) Assignee: EMC Corporation, Hopkinton, MA (US)

( * ) Notice: Subject to any disclaimer, the term of this patent is extended or adjusted under 35 U.S.C. 154(b) by 1026 days.

(21) Appl. No.: 11/863,940

(22) Filed: Sep. 28, 2007

(51) Int. Cl.
*H04L 29/06* (2006.01)
(52) U.S. Cl. .......................................................... 726/1
(58) Field of Classification Search .................. None
See application file for complete search history.

(56) References Cited

U.S. PATENT DOCUMENTS

| | | | |
|---|---|---|---|
| 6,847,970 B2 * | 1/2005 | Keller et al. ............................ 1/1 |
| 7,665,119 B2 * | 2/2010 | Bezilla et al. ........................ 726/1 |
| 7,788,536 B1 * | 8/2010 | Qureshi et al. .................. 714/38 |
| 2005/0125688 A1 * | 6/2005 | Ogawa et al. .................. 713/200 |
| 2007/0180490 A1 * | 8/2007 | Renzi et al. ........................ 726/1 |

* cited by examiner

*Primary Examiner* — David Pearson
(74) *Attorney, Agent, or Firm* — Krishnendu Gupta; Gerald P. Kazanjian

(57) ABSTRACT

In a large network, it can be difficult to pinpoint and track down the causes of breaches of established policies. A compliance policy server allows traversal of notifications according to breaches, organizes the breaches (vulnerabilities and violations) according to severity and recurrence, and identifies related rules and application services and network entities which may be related to the breach. An integrated graphical user interface (GUI) provides efficient, timely traversal and analysis of rule breaches across the network to allow quick, efficient identification of the underlying cause or condition of the rule breach, as well as identify impact on application services and network entities. A discoverer gathers configuration data including notifications of changes, alerts, and conditions in the network that are pertinent to the rule breaches. A compliance engine evaluates the configuration and topological data against the rules to identify breaches. Collective breaches pertaining to a common application or service or dependency indicate a common underlying condition causing the breach, therefore providing efficient correction of the underlying condition.

15 Claims, 10 Drawing Sheets

APPLICATION SERVICE POLICY COMPLIANCE SERVER

BACKGROUND

In a managed information environment, a network fabric, or infrastructure, interconnects network elements, or nodes, for providing various services to end users that are also connected to the network. In a managed information network, for example, a number of storage arrays are adapted to provide data storage and retrieval services. The storage arrays connect to other elements such as switches and hosts to efficiently provide the data storage and retrieval services to the users. Further, each storage array includes a set of individual storage devices (e.g. disk drives) that are themselves considered network elements, or entities. The collection of elements defines a configuration of the information network that is often updated to respond to changes in the network, such as for performance improvements, message traffic redirection, and equipment failures.

In a typical information network, the number of interconnected elements can become large, resulting in a substantial number of relationships and dependencies between the network elements (nodes), the network connections between them, and the applications that execute on them. Accordingly, a set of rules may be implemented to identify best or mandatory practices in the network, such as providing a redundant link between critical nodes, or mandating deployment of application A on a node with application B, for example. This set of rules defines a policy that network administrators enforce to maintain the network in a predictable and manageable state. However, identifying and verifying compliance of each of the rules across the network may become cumbersome in a large network. Further, the policy including the rules may be driven by external factors, such as corporate directives, security requirements, industry best practices, and Federal compliance laws, as well as vendor supported configurations. Therefore, at any particular site or enterprise, there may be multiple policies to satisfy, each having a plurality of rules in effect.

In the managed information network, therefore, multiple policies proscribing or requiring network practices may be imposed. These policies specify various configuration guidelines, such as requirements for connections between nodes (hosts), application dependencies for services provided by the nodes, and configurations of individual nodes. Factors driving the policies include corporate internal best practices, vendor and industry recommendations, and governmental issues such as Sarbanes-Oxley (SOX) compliance. Each policy includes a plurality of rules that identifies network elements, or objects (hosts, services, or connections), a scope of the rule identifying which network objects it applies to, and a condition to test for satisfaction of the rule.

SUMMARY

A managed information network environment defines an IT infrastructure that provides various data services to users. Often such services rely on efficient transport of large amounts of data through a network. Typically, the IT infrastructure supports many consumers who, in effect, compete for the available network resources. Accordingly, information network operators such as employers, corporations, and universities, for example, establish information network policies (policies) to codify guidelines, or rules, that define best practices to ensure a fair, efficient and productive distribution of network resources to the users. Further, a network as defined herein refers to an IT infrastructure, and may encompass various systems such as IP networks, storage arrays, servers and distributed applications, and is not intended to be limited to a conventional set of IP or Fibre Channel conversant switching devices.

In an IT infrastructure, including a network and interconnected entities, a breach of best practices takes the form of vulnerabilities and violations. A violation is a deviation from an expected standard set by a rule, typically expressed as a value deviating from an expected range. A vulnerability is an area of concern that has not yet risen to the gravity of a violation. The network conditions contributing to a vulnerability (potential rule violation) can often be tracked and identified before rising to the level of a rule violation. Identification of anomalies along a path (interconnection) or group of related network objects can lead to identification and correction of a less than optimal condition before it becomes a violation. For example, a rule may specify a maximum high water mark of available space in a storage array. If a rule requires at least 10% free space of a storage array be available, identification of the condition at 85% capacity (a vulnerability) may allow remedial action before a violation occurs at 90%.

Configurations herein are based, in part, on the observation that in a large IT infrastructure, it can be difficult to pinpoint and track down the causes of rule violations deviating from established policies. A typical IT infrastructure includes various systems such as IP networks, storage arrays, servers and distributed applications with its respective services. Network event and monitoring systems generate a multitude of notifications of occurrences and changes in the network. In particular, there is an emerging trend of application/service architectures in favor of conventional client/server architectures. Such application/service architectures define computing environments as a set of services executing on hosts. The hosts, in turn, interconnect with a storage side of the infrastructure managing storage entities, as disclosed in copending U.S. patent application Ser. No. 11/933,586, filed concurrently, entitled "NETWORK POLICY BREACH INVESTIGATION INTERFACE". In contrast to managing storage side (storage array) infrastructure entities, application/services integration present different monitoring and breach circumstances. The applications provide the computing resources to the end users, and invoke the services on the respective hosts. Depending on the needs of the users, there may be many applications invoking a relatively small number of services, or a sole application invoking many services. The configuration of applications and services defines a dependency hierarchy that presents challenges to breach identification. Balancing services, or more appropriately, instantiations of services, across available hosts strives to load balance the IT infrastructure. The policies and rules therein are focused on practices consistent with such load balancing to allow the infrastructure to operate efficiently. Such rules may specify, for example, that there be at least two redundant paths from an application to a particular service subscriber (consumer of the application), or that there be no more than 3 instantiations of a service on a particular host. In a storage area network for example, a service serving up a particular database application may cause excessive contention with more than 3 instantiations. Alternate configurations could include policies and rules touching upon any of the following (but not limited to):

Access control and/or authorization
   Software and firmware versions
   Services allowed to run on a host
   Services used by specific host Combination of any of the above
Performance constraints that lead to load balancing
User authorization Conventional application side environment monitoring mechanisms, however, suffer from shortcomings that they do not categorize notifications according to those triggering rule violations, and do not identify related network entities and rules based on a particular breach. Accordingly, configurations herein substantially overcome the shortcoming of conventional policy monitoring and enforcement by providing a policy compliance server, disclosed further below, allows traversal of notifications according to breaches, organizes the breaches (vulnerabilities and violation) according to severity and recurrence, and identifies related rules and network entities which may be related to the breach. An integrated graphical user interface (GUI) provides efficient, timely traversal and analysis of rule breach across the network to allow quick, efficient identification of the underlying cause or condition of the rule breach.

To ensure compliance with the policy or policies in effect for a given IT infrastructure (network), the rules of the policy are periodically evaluated. A discoverer or other suitable mechanism traverses the network to gather configuration data pertaining to the general state of the network. The configuration data includes notifications of changes (including configuration, relationship, and dependency changes), alerts, status, state, and conditions in the network that are pertinent to the rule compliance. A compliance engine evaluates the configuration data against the rules to identify breaches. Therefore, the compliance engine identifies breaches (rule violations and vulnerabilities) across the network to be addressed and corrected for compliance with the policies in effect in the network.

The compliance engine is responsive to the GUI for traversing the violations by an operator to evaluate the rule breaches and identify network conditions contributing to each of the breaches. Often, a condition underlying a rule breach contributes to or causes other breaches in related network entities. An operator evaluating the violations may employ the GUI to traverse the violations, identify related objects and rules, and drill down into the network conditions resulting in the rule breach (breach) to determine the underlying cause. The GUI therefore provides an operator tool for efficient traversal of violations to pinpoint conditions causing the breach and provide a remedy.

In further detail, the configurations herein disclose a GUI for tracking and monitoring policy and rule compliance on the application (and/or service) side of the IT infrastructure. The method of assessing application compliance with network policies as disclosed herein includes identifying a set of rules, in which each of the rules defines a desired state of the application or services serving up the application, and performing discovery on applications and the consumers of the application services configured in a network environment, in which the applications are coupled to services executing on hosts in the network environment, such that discovery identifies configuration data applicable to the rules. Such configuration data is not limited to relationships between entities, and also includes dependency (i.e. direct and indirect consumers of the services)—data applicable to the rules. The configuration data is used to assess rule and policy compliance via a policy compliance server that receives notifications indicative of the discovered configuration data, in which the notifications reflect modification of a particular value of a network state. A compliance engine in the policy server compares the received modified value with a desired intended value specified in a corresponding rule, and identifies a rule breach, in which the breach is indicative of a network state misaligned with a rule, by comparing a received modified value with the value corresponding to the desired state.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
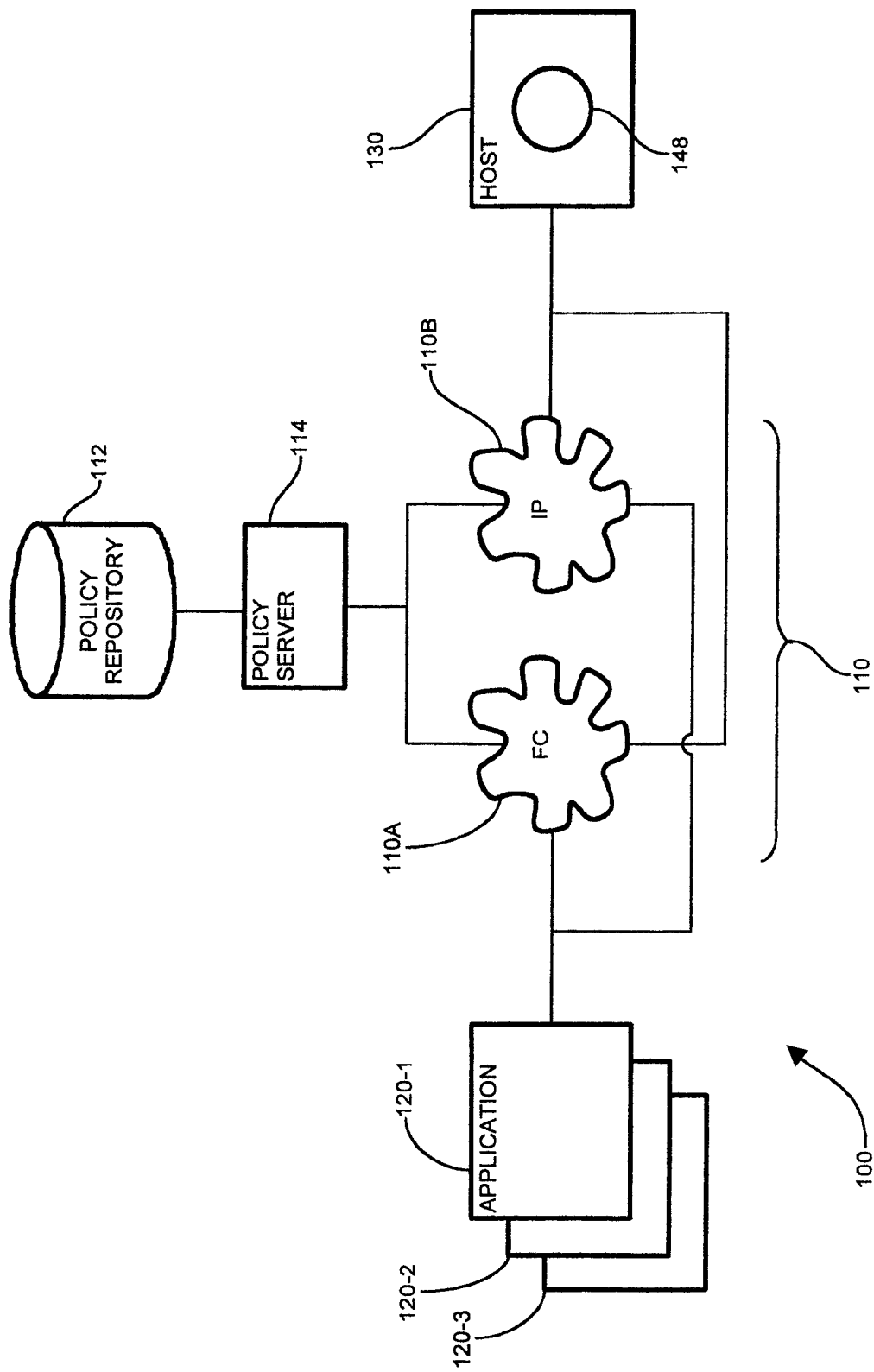
FIG. 1 is a context diagram of a managed application services environment suitable for use with the present invention; —see FIG. 1 for comments and updates to this figure.

In an information network environment, adherence to an established policy facilitates efficient and fair distribution of resources to all users of the network. Similarly, deviation from the established policies can cause slowdown, bottlenecks, and outright failures or other circumstances leading to reduced or interrupted provision of services to some or all users of the IT infrastructure. Further, in large and complex networks, it can be difficult to pinpoint and track down the causes of rule breaches deviating from established policies, as well as determine what the impact is on a given application services and its dependencies (includes direct and indirect consumers). Accordingly, configurations herein are based, in part, on the observation that identifying problematic notifications and the underlying condition triggering rule breaches can be difficult in a large network environment where many notifications pertaining to both malignant and benign occurrences are collected.

Unfortunately, conventional environment monitoring mechanisms do not categorize notifications according to those triggering rule breaches, and do not identify related network entities, application, services, and consumers of the application services and rules that may also be related. Accordingly, configurations herein substantially overcome such shortcomings by allowing traversal of notifications according to rule breaches, organizing the breach according to severity and recurrence, and identifying other rules and network entities such as applications, hosts, services, and consumers which may be related to, or affected by, the rule breach. In this manner, configuration herein provide a graphical user interface for efficient, timely traversal and analysis of rule breach across the network to allow quick, efficient identification of the underlying cause or condition of the rule breach.

In conventional monitoring, operators are limited at the host (with applications) all the way down to the storage. Configurations herein substantially overcome such deficiencies by showing a view beyond the applications on the host to the relevant underlying application services (programs that reside on the host to service up the application) and especially the consumers or clients of the applications services—both direct as well as indirect consumers (i.e. dependencies). What makes this compelling is that knowing which consumers are accessing the application services allows the end-user to know that if there is a breach or configuration change within any of the underlying network infrastructure, the end-user can quickly assess the impact to the consumer.

Identification of policy breaches is not just limited to showing impact but also extending the compliance policy server to process and enforce policies and rules based on applications, services, dependencies, service levels, topology, performance, etc. that may in turn be rolled into a comprehensive breach diagnostic process or application. Various configuration changes, including those from the applications all the way down to storage, configuration changes on objects, topology changes, relationship changes, dependency changes, and others, combine with extended reporting to implement a comprehensive breach reporting and monitoring tool. As part of comprehensive breach investigation, it is one objective to ultimately narrow down and identify the root cause of an incident/problem as well as show the impact on not just the immediate objects in the path but the application services consumers (or dependencies) that are utilizing those resources. In the example network infrastructure shown, an application services path traverses the network from an application on a host to a port on storage array (storage entity). This application services path is further expanded to include the dependencies, or consumers (or client) of the services that serve up the application on a host. The application services path is further defined by an abstraction model, discussed further below, as an aggregation of physical, logical links, virtual links, and/or dependency links.

As mentioned previously, it is beneficial to show dependencies to provide a display that extends out the path to be able to show service impact on the hosted applications (on the host), and its related dependencies, such as clients to the host (consumers of the hosted application services), i.e. other servers. For example, a host that is hosting a database server in a web application may have consumers that include a web server which is accessing the application server which in turn accesses the database server. In the examples shown, services in this diagram are application services, i.e. services that are running that are part of the application (or subcomponents of the application). The resulting dependencies form relationships analogous to a "social network" where you show the related dependencies (i.e. consumers/clients which are using any hosted application on the host that is connected to the storage).

FIG. 1 is a context diagram of a managed information network environment suitable for use with the present invention. Referring to FIG. 1, an managed information environment 100 includes a storage area network 110, including a Fibre Channel 110A and IP 110B networks, interconnecting a plurality of applications 120 with at least one host 130 executing a plurality of services 132-1 . . . 132-N (132 generally) executing on the hosts 130. In such a SAN environment, disclosed for illustrative purposes, all host may be connected to the SAN; however, for application services, they may pr may not traverse a SAN today but are adapted for future developments such that Fibre Channel and IP networks converge. Accordingly, many hosts today may connect to 2 networks 110A and 110B and so do the elements in the SAN as well. The storage area network 110 (SAN) employs policies stored in a policy repository 112 and administered via a policy server 114.

In a typical managed information network, the number of interconnected elements can become large, resulting in a substantial number of relationships between the network elements (nodes), the network connections between them, and the applications 120 that execute on them. Accordingly, a set of rules may be implemented to identify best or mandatory practices in the information network, such as providing a redundant link between critical nodes, or always deploying application A on a node with application B, for example. This set of rules defines a policy that network administrators enforce to maintain the network in a predictable and manageable state. In the managed information network 100, therefore, multiple policies proscribing or requiring network practices may be imposed. These policies specify various configuration guidelines, such as requirements for connections between nodes (hosts), application dependencies for services provided by the nodes, and configurations of individual nodes. Each policy includes a plurality of rules that relates to network elements, or managed objects (hosts, application, services, or connections to consumers), a scope of the rule identifying which network objects it applies to, and a condition to test for satisfaction of the rule.

Such rules are generally in the form of [object] [scope] and [condition], where the object defines the managed object the rule applies to, and scope refines the object set. The objects typically specify hosts (nodes), services (applications) and dependencies (hosts with direct and indirect connections to the host are hosting the applications). The condition then defines the test criteria to determine compliance with the rule. Failure to satisfy the condition constitutes noncompliance with the rule, and a predetermined number of failed rules indicate failure of the policy to which they belong. The rules of a policy are generally selected along a particular theme, such as security, standards compliance, or efficiency. Rules may often be predicated on connections between nodes or applications. A retail organization that uses credit cards may have a policy that there should be no connectivity between payroll server and credit card server, since there is no flow in the normal business model that employs such a connection. If the compliance data indicates such a connection, it indicates a potential data breach. As a further example, the compliance data indicates a count of connections between nodes. Accordingly, the rules may indicate how to identify whether particular connections are improper. A security policy might include a rule to check that all client connections from a call center to a credit card authorization system use a secure protocol. An unsecured connection may indicate a vulnerable link, fraud, or unauthorized employee usage. Further details on policy and rule scope and definition may be found in copending U.S. patent application Ser. No. 11/769,407, filed Jun. 27, 2007, entitled "POLICY BASED NETWORK COMPLIANCE" and copending U.S. patent application Ser. No. 11/769,499, filed Jun. 27, 2007, entitled "RULE BASED NETWORK RESOURCE COMPLIANCE", both incorporated herein by reference.

Figure 2:
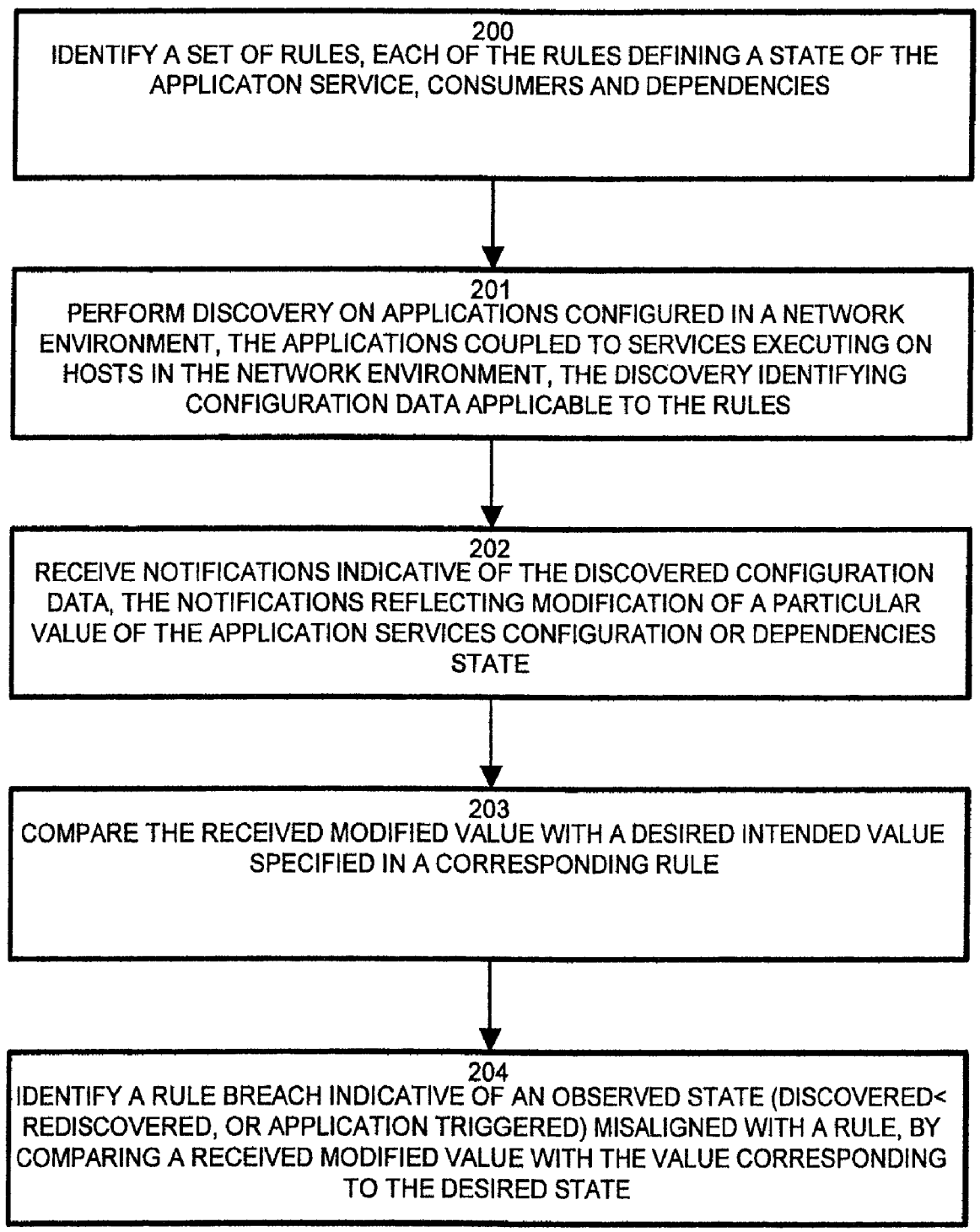
FIG. 2 is a flowchart of breach processing in the environment of FIG. 1.

FIG. 2 is a flowchart of breach processing in the environment of FIG. 1. Referring to FIGS. 1 and 2, the method of assessing application compliance with application services policies 124 as disclosed and claimed herein includes, at step 200, identifying a set of rules 124, such that each of the rules 124 defines a desired state of the network 110, and performing discovery on application services 142 configuration and consumer dependencies (both direct and indirect) configured in the network environment, as depicted at step 201. The applications 142 are coupled to services 148 executing on hosts 146 in the network environment 110, such that discovery identifies configuration data applicable to the rules 124. The compliance policy server 114 receives notifications 116 indicative of the discovered configuration data, such that the notifications 116 reflect modification of a particular value of the application services configuration or dependencies state within the network, as shown at step 202. The compliance engine 134 compares the received modified value from the notification 116 with a desired intended value specified in a corresponding rule 124, as depicted at step 203, and identifies a rule breach indicative of an observed state (discovered, rediscovered, or triggered by a notification of the application services and its dependencies) misaligned with a rule, as disclosed at step 204. Such a rule breach is indicative of an application services state misaligned with a rule, and is determined by comparing a received modified value with the value corresponding to the desired state.

Figure 3:
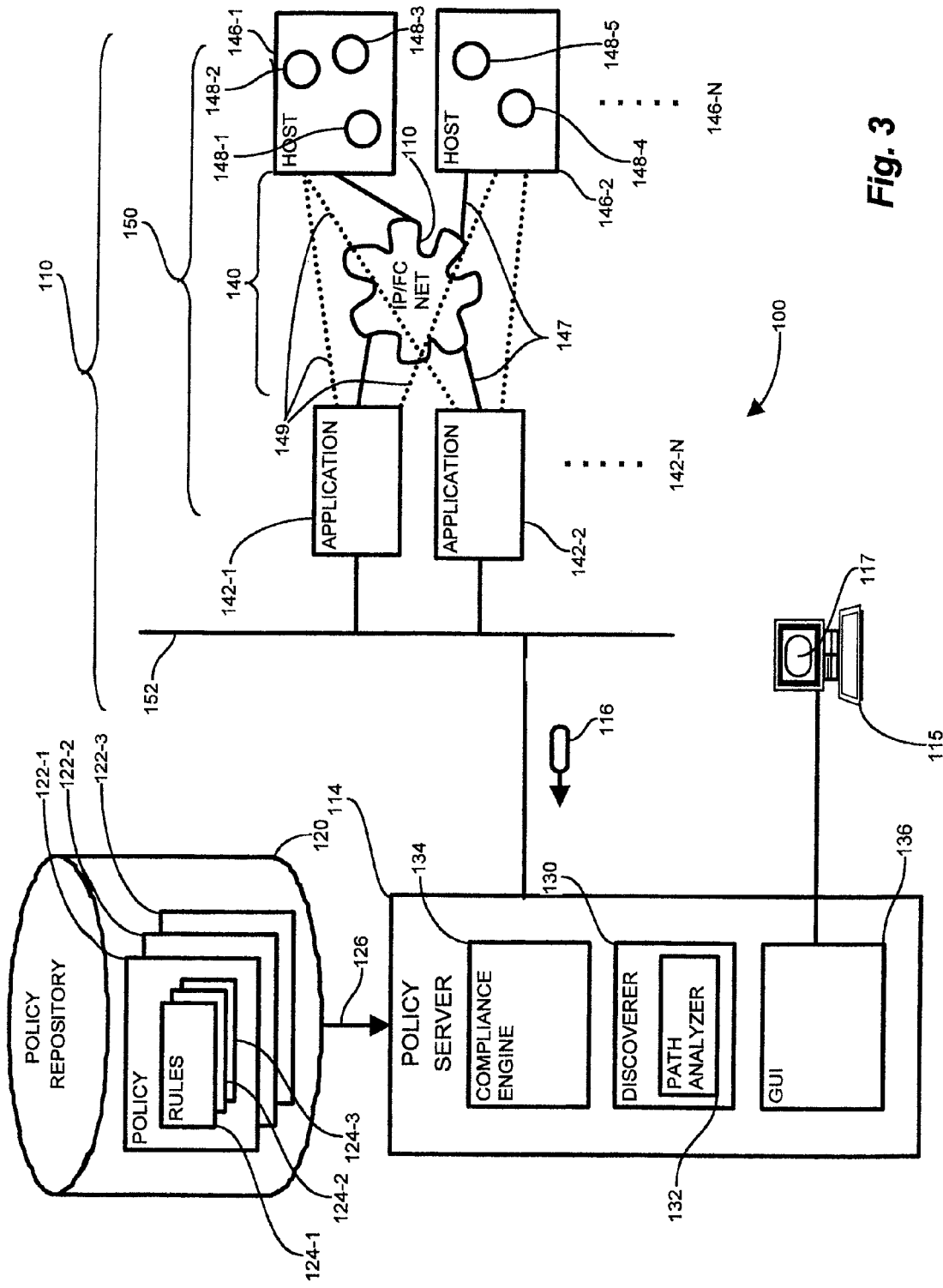
FIG. 3 is a block diagram of traversal and analysis of notifications pertaining to IT entities triggering breaches in the environment of FIG. 1.

FIG. 3 is a block diagram of traversal and analysis of notifications pertaining to application services entities triggering breaches. Referring to FIGS. 1 and 3, the policy repository 112 includes a plurality of policies 122-1 . . . 122-3 (122 generally), and within each policy, a plurality of rules 124-1 . . . 124-3 (124 generally). The policies 122 and rules 124 are defined by any suitable method, such as those disclosed in copending patent applications cited above.

The policy server 114 includes a discoverer 130 having an application services path analyzer 132, a compliance engine 134, a GUI 136, and a policy management interface 126 to the policy repository 120. The discoverer 130 receives notifications 116 from the network 110, including information pertaining to state changes triggering policy breaches. The compliance engine 134 receives policy 122 and rule 124 information via the policy interface 126. The application services path analyzer 132 further identifies related network entities 150 and rules 124 related to a given breach so that particular rules 124 may be applied in real time. The compliance engine 134 analyzes the state changes given by the notifications 116 to conclude whether breaches have occurred, and also identifies whether the breach is a violation or a vulnerability. The GUI 136 accumulates analysis concerning breaches for rendering to a user/operator via a display screen 117 on an operator console 115.

The compliance policy server 114 couples to the network 110 via an interface 152, and receives notifications 116 and performs discovery in accordance with principles outlined herein. The network 110, which in the example arrangement is a storage area network (SAN), interconnects network entities 150, including network objects such as applications 142-1 . . . 142-2 (142 generally), hosts 146-1 . . . 146-2 (146 generally), and services 148-1 . . . 148-5 executing on the hosts 146. The applications 142 and services 148 may be distributed across the network, or alternatively, the application 142 and underlying application services 148 reside within a host 146 (i.e. is served up by a host). The network infrastructure providing the host/services coupling may be IP, FC, or other interconnection, as discussed in FIG. 1. The network entities 150 interconnect in a fabric 140, which further defines other network entities such as physical links 147 and logical links 149.

Figure 4:
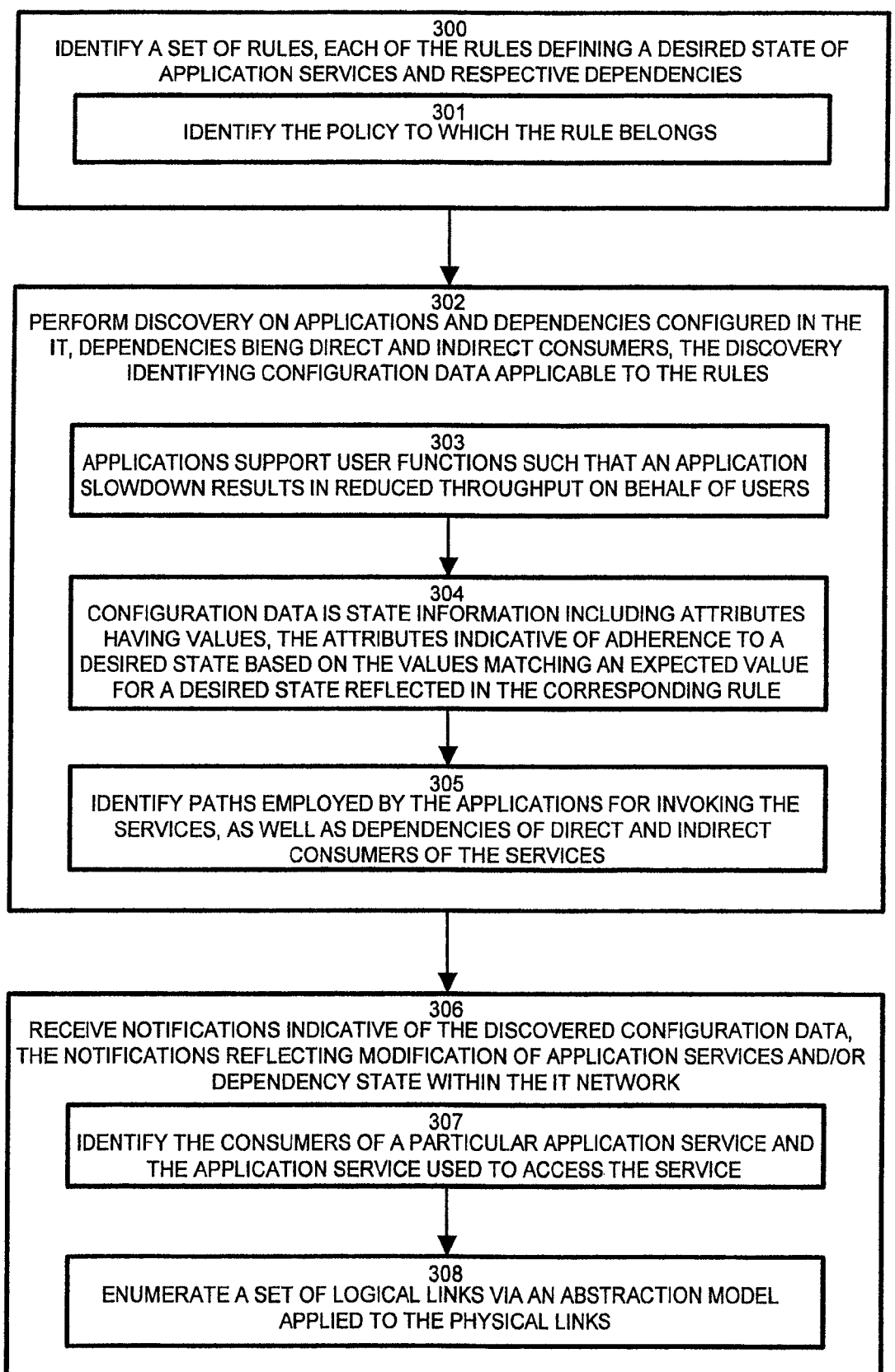
FIGS. 4-6 are a flowchart of breach investigation employing the GUI for traversing and analyzing the violations.
Figure 5:
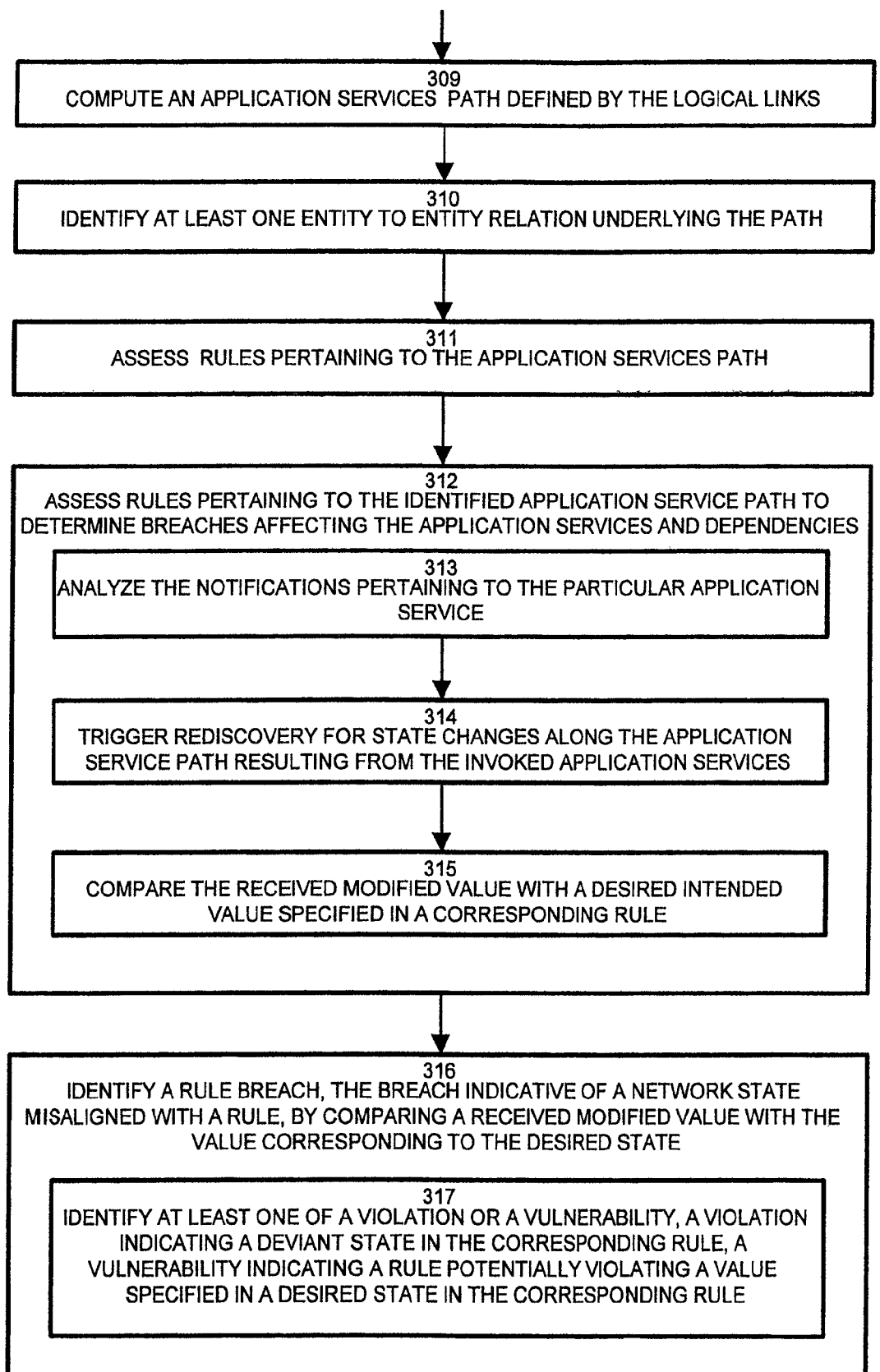
Figure 6:
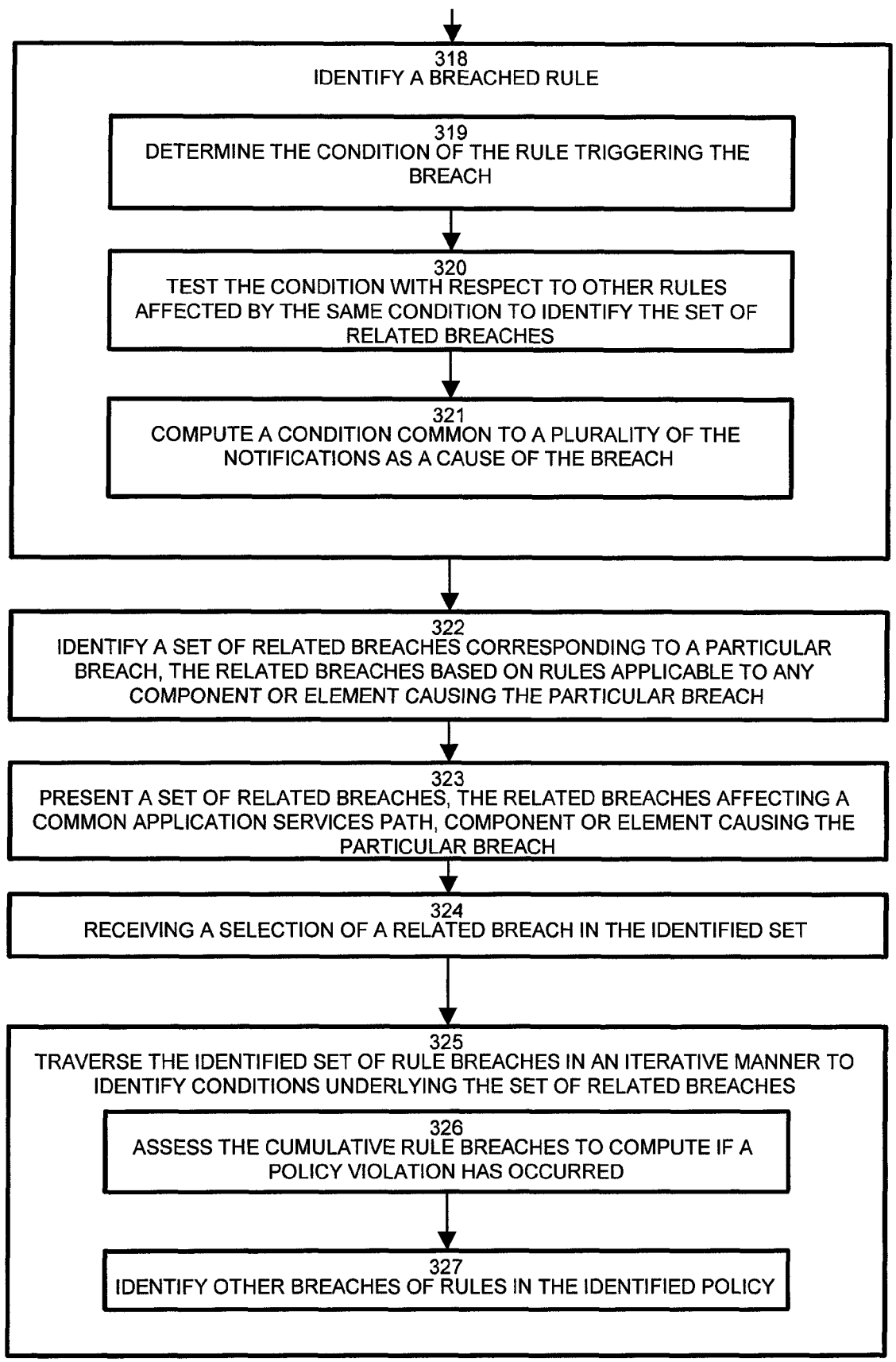

FIGS. 4-6 are a flowchart of breach investigation employing the GUI for traversing and analyzing the breaches. Referring to FIGS. 1 and 3-6, the policy server 114 identifies a set of rules 124 defining a desired state of the IT infrastructure 100, including the network 110, as depicted at step 300. The plurality of rules 124 define a policy 122, such that identifying a breach further includes identifying the policy 122 to which the rule 124 belongs, as specified at step 301. Policies 122, as outlined above, may be legislative, such as Sarbanes-Oxley (SOX), enterprise or corporate wide, or vendor based from recommended practices. As applied to the configurations herein, in the case of Sarbanes-Oxley, HIPAA, SEC, PCI regulatory environments, typically those are more relevant to the applications and it's harder to map it back to the underlying network infrastructure. By being able to assess violations and vulnerabilities and identifying the risks, one can quickly surmise the implications relevant to the regulations and take appropriate actions.

The discoverer 130 performs discovery on applications 142 configured in the network environment 100, as shown at step 302, in which the applications 142 couple to services 148 executing on hosts 146 in the IT infrastructure (i.e. network environment) 100, such that the discovery process identifies configuration data applicable to the rules 124. In the IT infrastructure 100, the applications 142 support user functions such that an application slowdown from rule breaches results in reduced throughput on behalf of users, as depicted at step 303. The discovered configuration data is state and topological information including attributes having values, such that the attributes are indicative of adherence to a desired state based on the values matching an expected value for a desired state reflected in the corresponding rule 124, thus indicating a deviation or shortcoming from the optimal or intended state specified by the rule, as disclosed at step 304. In the example shown, the services 148 execute on hosts 146 responsive to the applications 142, such that each of the services provides services to at least one, and possible many, applications 142, as depicted at step 305.

Discovery takes the form of received notifications 116; accordingly the compliance policy server 114 receives notifications 116 indicative of the discovered configuration data, in which the notifications reflect modification of a particular value of an application services state, as disclosed at step 306. In the infrastructure 100, the applications couple to the services via links, such that the application services path analyzer 132 identifies links to a particular service 148, as depicted at step 307. The links further define physical links, virtual links and logical links, such that the application services path analyzer 132 enumerates a set of logical links 149 via an abstraction model applied to the physical links 147, as depicted at step 308. Thus, a particular physical link 147 may support a number of logical links 149, and a sequence of physical links 147 may provide a logical link 149 spanning many network entities 150. The virtual links may further include trunking, routing, virtual networks, as well as direct and indirect connections from consumers to hosts serving up applications via services.

To assess and report rule breaches along the same path, the application services path analyzer 132 computes a path defined by the logical links 149 on which a particular breach occurred, as depicted at step 309. This identifies the application services paths employed by the applications 142 for invoking the services 148 for which the rule 124 was triggered. The paths therefore denote access to the application services, defines as connectivity between the host serving up the application services and the dependencies/consumers (be they direct or indirect). The computed application services path, denotes the relationship of the host and consumers/clients (of the hosted application services) and includes the communications path used to access the application services. The application services path analyzer 132 identifies at least one entity 150 to entity 150 relation underlying the path, as shown at step 310. The relation between the network entities identifies related network entities 150. From the identified paths, the application services path analyzer 132 assesses rules pertaining to the path, as depicted at step 311, and assesses rules 124 pertaining to the identified application services path to determine breaches affecting the application services and dependencies, as shown at step 312. This may include, at step 313, analyzing the notifications 116 pertaining to the particular application service 148 affected by the breach, and trigger rediscovery to leverage notification in determining if there is a state change on any element in the application services path resulting from the invoked services 148, as depicted at step 314. For other notifications affecting the same service 148 or links 147, 149 the compliance engine 134 compares the received modified value with a desired intended value specified in a corresponding rule 124, as shown at step 315. Alternate definitions of related notifications may be employed to tune the reevaluation of notifications pertaining to related entities 150.

From the comparison of the notifications 116 and the rules 124, the compliance engine 134 identifies a rule breach, in which the breach is indicative of a application services state misaligned with a rule, by comparing a received modified value (from the notification 116) with the value corresponding to the desired state (given by the rule), as depicted at step 316. Identification of a breach further includes identifying either a violation or a vulnerability, such that a violation indicates a deviant state from the corresponding rule, and a vulnerability indicates a rule potentially violating a value specified in a desired state in the corresponding rule 124, as disclosed at step 317. The breach identification points to, among other irregularities, bottlenecks at hosts from the identified paths and computed loads providing a plurality of services 148 to multiple applications, and allows an operator to traverse the breaches to identify an underlying condition causing the slowdown, discussed further below.

The policy compliance engine 134 identifies the content of the breached rule 124, as shown at step 318, and determines the condition of the rule triggering the breach, as depicted at step 319. As indicated above, each rule specifies a condition for compliance, including the non-deviating states (values). Accordingly, the discoverer will test the condition with respect to other rules affected by the same condition to identify the set of related breaches, as depicted at step 320. Retesting, or rediscovery, is performed for each related entity in the application services path, to compute or identify a condition common to a plurality of the notifications as a cause of the breach, as shown at step 321. That is, the deviating condition (value) is rechecked against related entities with respect to the deviating condition to see if the deviant value affects other related entities.

Rediscovery identifies a set of related breaches corresponding to a particular breach, as specified at step 322, such the related breaches are based on rules applicable to a network entity 150 causing the particular breach (i.e. a condition triggering the breach). Thus, the network entity causing the breach may be determined to be any component or element (includes host and consumer) in the application services path. The GUI 136 presents the identified set of related breaches to an operator via the operator screen 117, as depicted at step 323, thus presenting a set of related breaches in which the related breaches affecting a common path or network entity 150, the network entity 150 therefore being any component or entity causing the breach. From the operator device 117, the GUI 136 receiving a selection of a related breach in the identified set for further investigation and drill down, as shown at step 324.

Using the identified related breach, the GUI allows traversal of the identified set of rule breaches in an iterative manner to identify conditions underlying the set of related breaches, as shown at step 325. Such traversal examines and assesses the cumulative rule breaches to compute if a policy breach has occurred, as depicted at step 326, by identifying other breaches of rules in the identified policy, as shown at step 327.

Figure 7:
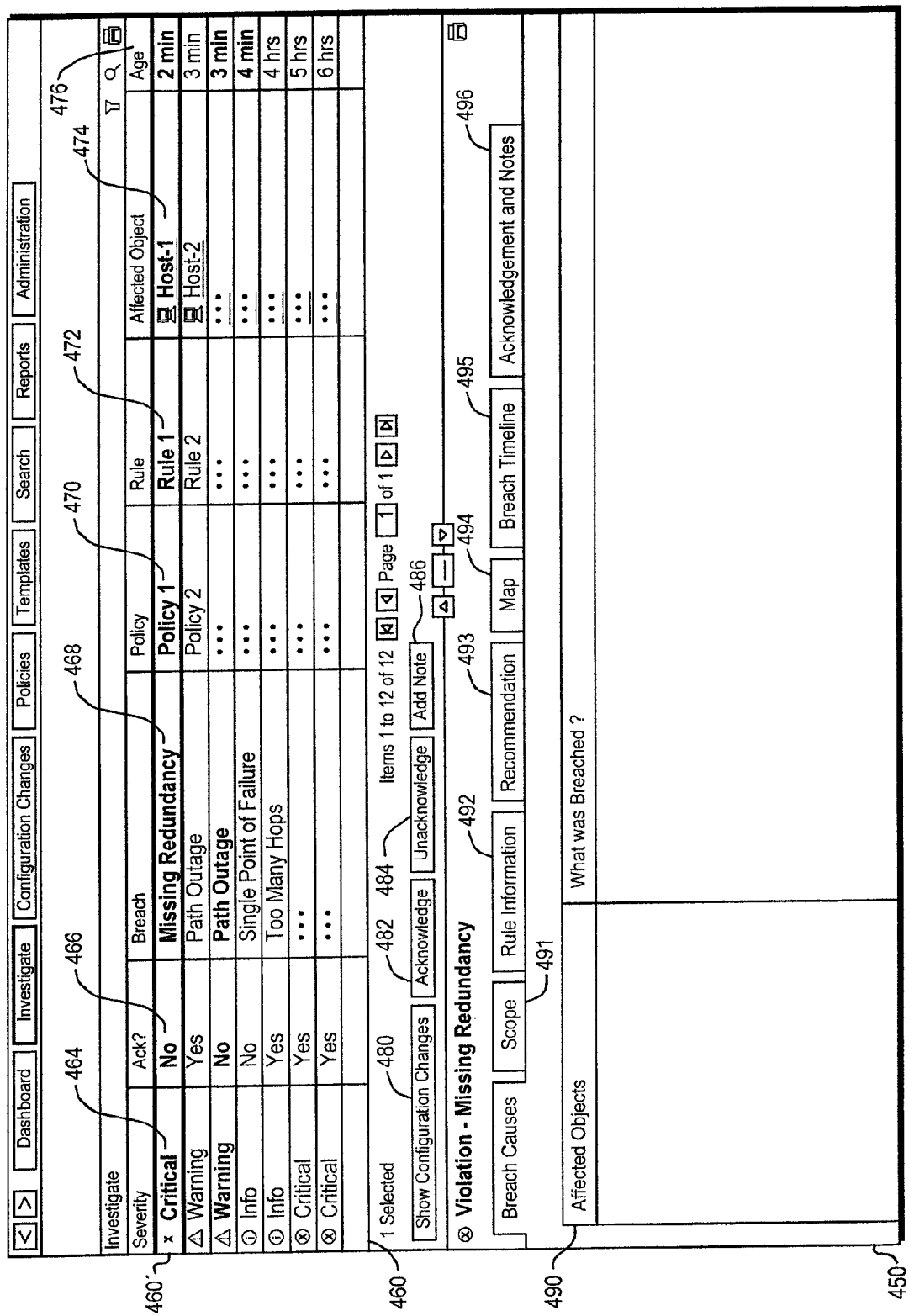
FIG. 7 is a breach dashboard view depicting a breach overview.

FIGS. 7-10 are breach investigation views rendered by the GUI in the sequence outlined in FIGS. 4-6. FIG. 7 is a breach investigation view showing a set of notifications. Referring to FIGS. 3 and 7, the investigate view 450 includes a notification list 460 and a detail window 490. The notifications list 460 includes a current selection set 462 of notifications 116 for further investigation via drill down GUI activity. A severity attribute 464 indicates the severity of the notification 116. An acknowledgment attribute 466 indicates whether an operator has acknowledged this breach, settable by buttons 482 and 484. A breach attribute 468 indicates the condition, standard or setting that was breached, and the policy and rule attributes 470, 472 indicate the rule and policy that was breached. An affected object attribute lists the managed objects, applications, and related dependencies 150 issuing the breach 116.

The detail window 490 contains further details about a selected notification 460' depending on a set of violation tabs 490-496. A breach causes tab 490 shows related objects and entities based on the path and group of the affected object 474. A scope tab 491 shows the scope of the rule from which the breach was triggered, and a rule information tab 492 shows additional rule specifications such as the condition and expected value the rule requires. A recommendation tab 493 shows typical or known remedial action to undertake for a particular rule breach. A map tab 494 shows a graphical rendering of the position of the affected object 474 in the network fabric 140. A breach timeline 495 lists the first and most recent occurrences of a breach in a series of recurring breaches affecting the same entity 150, thus removing the need to explore uncorrelated redundant occurrences of a recurring breach. An acknowledgment and notes tab 496 displays the acknowledgment status as set per buttons 482 and 484, and any notes entered by an operator via notes button 486. The show configuration changes 480 lists related configuration changes related to any entity in the application services path, which typically have a high correlation to breaches occurring shortly thereafter.

Figure 8:
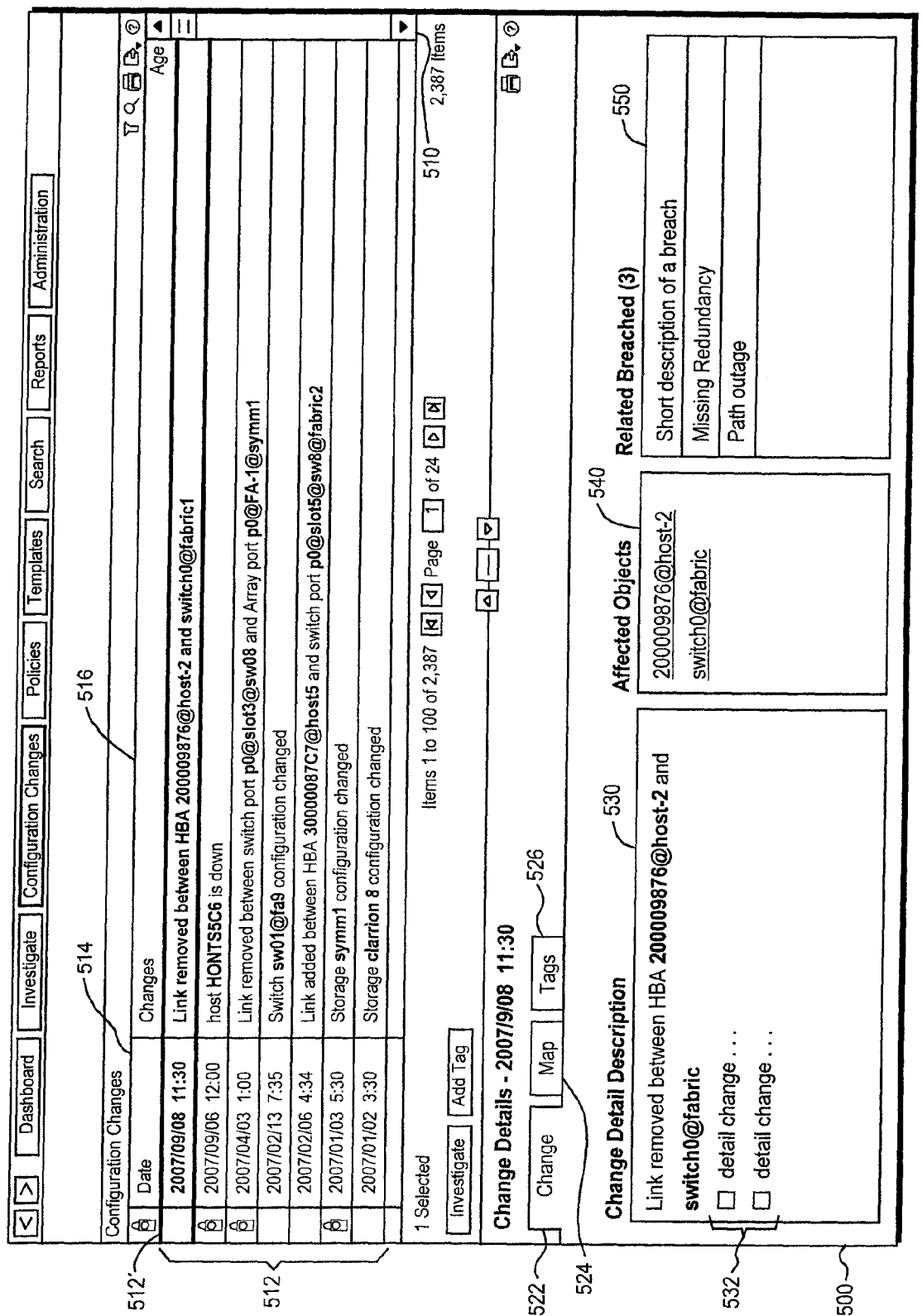
FIG. 8 is a breach investigation view showing a set of notifications.

FIG. 8 is a configuration change screen itemizing configuration changes. Referring to FIGS. 3 and 8, the configuration changes view 500 displays notifications pertaining to configuration changes in the network 110. As stated above, configuration changes tend to have a high correlation to breaches, and are therefore en efficient locator of suspect occurrences and breach causes. The configuration changes view 500 includes a change notification window 510 including a set of change entries 512, and a tab window 520 for displaying detail tabs for change 522, maps 524 and tags 526. The tabs 522, 524 and 526 display additional information about a selected change entry 512' from the change notification window 510. Each change entry 512 includes a datestamp 514 and a description 516 about the change. For the selected entry 512' the change tab 522 shows change details 532 about the configuration change in a change details window segment 530, such as previous and new values/settings, usage metrics, and previous and recent configuration and topological changes, for example. The effected objects window segment 540 lists affected objects (such as entities 150), such as those in the same group or along the same application services path, discussed further below. These affected objects suggest those for which notification may be checked for identifying likely causes or related effects. A related breaches window 550 shows breaches affecting the related objects from the effected objects window 540.

Figure 9:
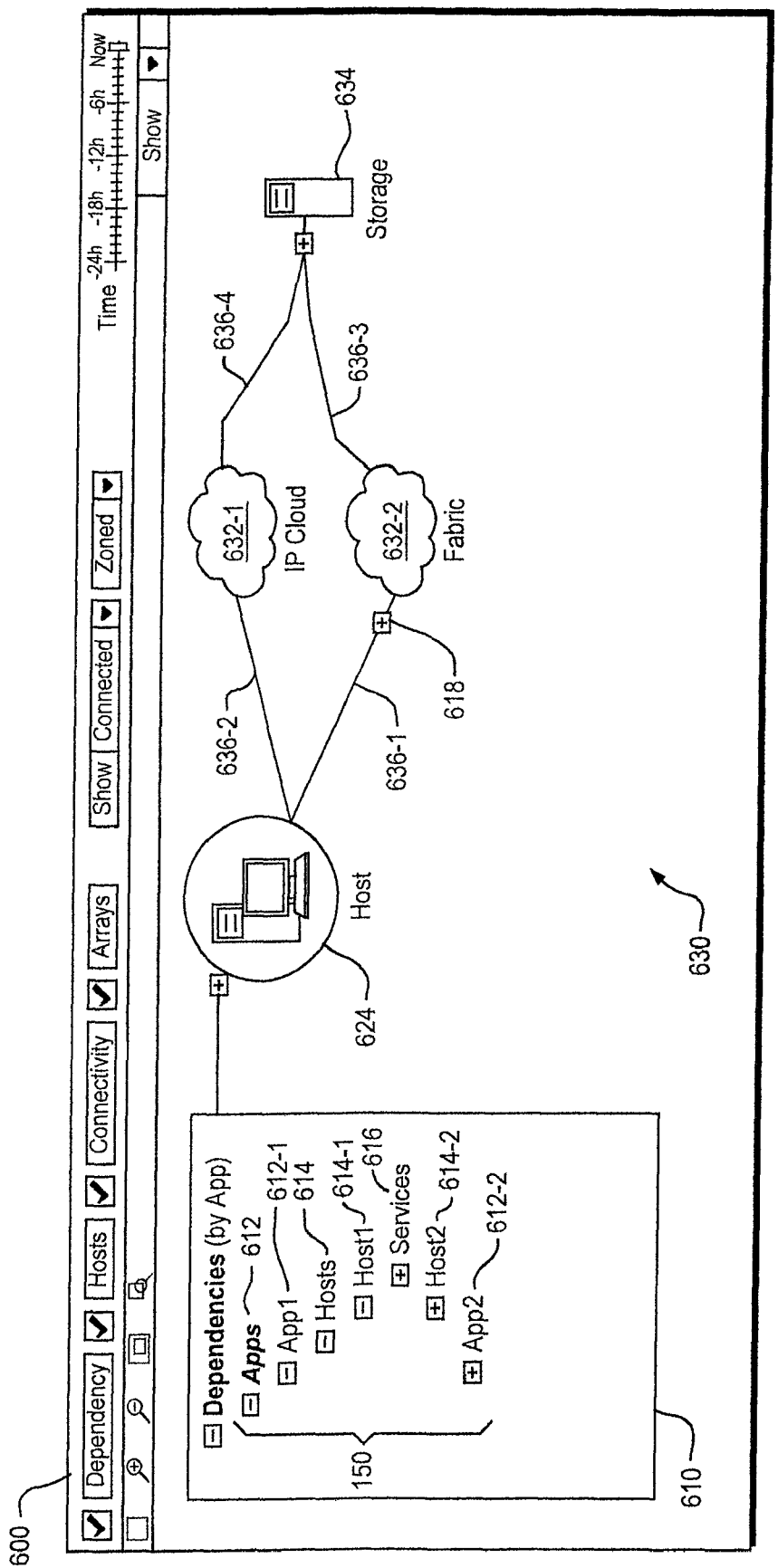
FIG. 9 is a configuration map depicting the application services path with the applications residing on the host along with the services that make up the application, as well as the dependencies (consumers that are utilizing the application services) along with their respective network entities.

FIG. 9 is a configuration map depicting network entities 150. Referring to FIGS. 3 and 9, the example GUI screen 600 includes a dependency window 610 and a map window 630. The dependency window 610 lists network entities 150 in a hierarchical manner showing the applications 612-1 . . . 612-N (612 generally), hosts 614-1 . . . 614-N (614 generally) they are linked to 614, and services 616-1 . . . 616-N (616 generally) provided by the respective host. For each entity 150, an expansion/contraction button expands the included entities 150 or specific information about the entity, in the case of an atomic (non-expandable) application 612, host 614 or service 616. The dependency window 610 therefore assists in identifying which network entities (consumers) 150 are affected by breaches at other network entities 150 upon which they are dependent. It should be noted that a client role refers to other hosts/servers (consumers) that are accessing the application services on host 614 via some kind of network 632. The host icon 624 that is connected to the storage service icon 634 in the example shown is running two applications (App1 and App2), which in turn can have one or more consumers (or clients) accessing the application or service that is running on the host icon 624.

The map window 630 illustrates interconnections 636-1 . . . 636-4 (636 generally) between hosts 614 and services 616 by graphic displays of host icons 624 and service icons 634. The service icons 634 may represent a service 616 supported by the host 614 or other interconnections, such as to a storage array invoked by the service 616. Interconnections 636 are supported by connection entities 632 generally, which may include IP subnetworks 632-1, a SAN fabric 632-2 (depicting a fabric 140) or other suitable interconnection mechanism. An expansion icon 618 further expands the fabric 632-2 into application services entities 150 for interconnection, such as switches and routers, that define the fabric 632-2. The interconnections 636 further include physical links 147 and logical links 149, and may be expanded by expansion buttons 618.

The example rules employed herein are adaptable to other contexts and environments, as well as various interconnections and protocols of the physical IT infrastructure. Specific types of policies & rules applicable to approaches disclosed herein include, but are not limited to:

Configuration (hardware & software)
Access control and/or authorization
Software and firmware versions
Application services allowed to run on a host
Services accessed by specific host
Services accessed by specific host using a specific protocol and/or port Performance rules, e.g. link utilization, load from number of I/O transactions observed/discovered, etc.
User authorization for configuration changes (hardware, software)
Service Connectivity, e.g. which consumers (host that function as clients to the application services provided by other hosts)
Service Redundancy
Time windows, e.g. time windows when certain configurations are valid (i.e. you can have a node with "revolving" configurations based on time of day for on-demand computing needs
Security From a GUI perspective, in alternate configurations, such rules may evolve so that compliance is observed from an application and/or application+tier perspective and/or user-defined group (grouping of network entities) in order to be able to see breaches, configuration changes, and/or dashboard views from different perspectives depending on the user personas (e.g. executive, business user, IT Manager, IT operator, etc.) who are using the disclosed approach. In breaches or configuration changes view, the affected objects may be expanded to show also the application services and consumers (direct and indirect dependencies) that are affected by a breach or configuration change.

Figure 10:
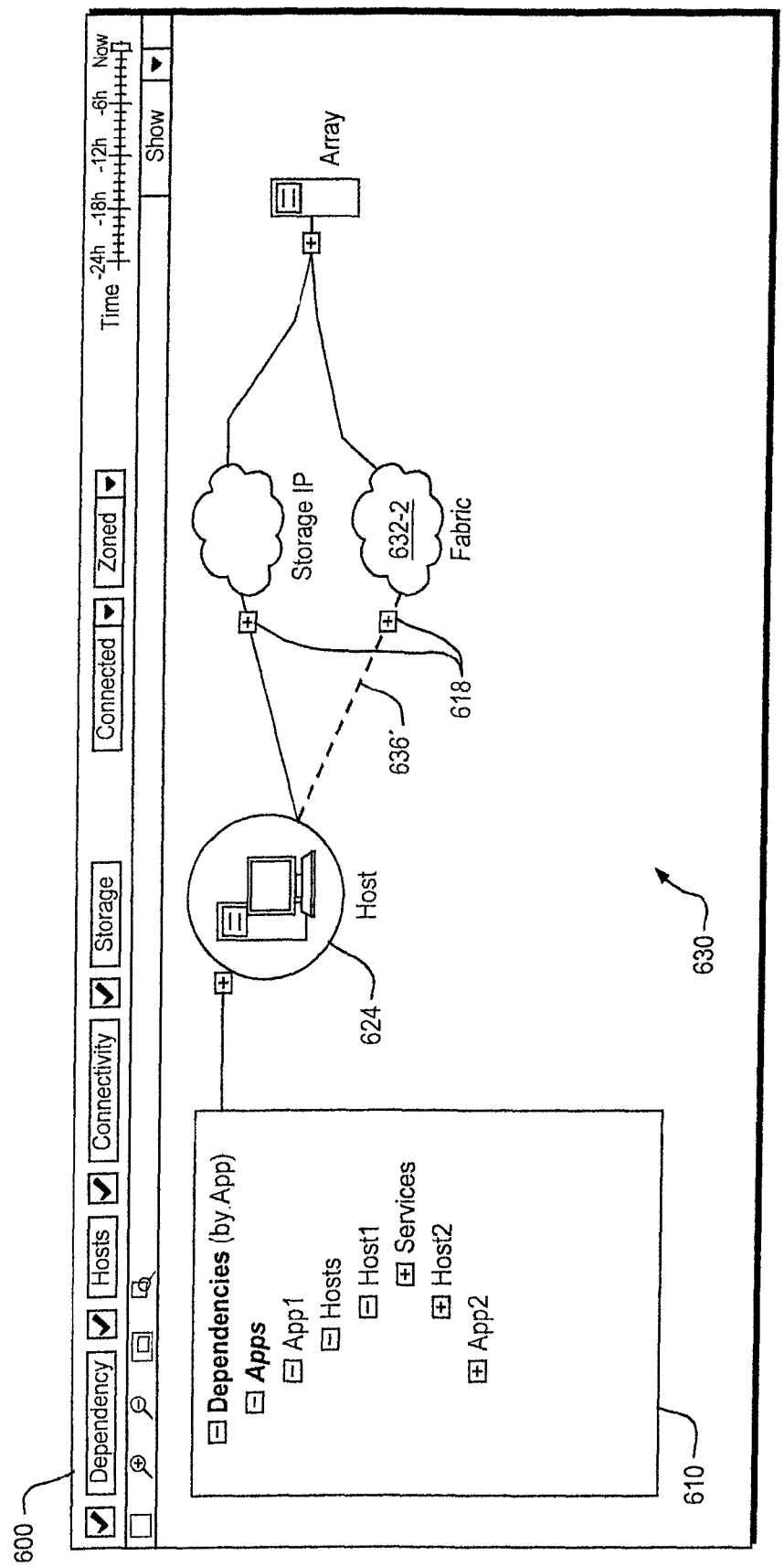
FIG. 10 is a configuration map depicting a network rule breach, and this also shows the impacted application and dependencies since the network rule breach traverses the entire application services path.

FIG. 10 is a configuration map depicting a network rule breach. Referring to FIGS. 3, 9 and 10, a graphic illustration of a rule breach affecting the link 636-1 between host 624 and fabric 632-2 is shown. The interconnection 636-1 presents a red dotted line 636' that illustrates a violation or vulnerability, which in turn allows the end-user to see the impacted application services entities 150. Such a breach may be, for example, an interruption to one of several physical links 147 that falls below the minimum redundancy value for the interconnection, or may represent a violation caused by complete interconnectivity loss, for example. The graphical nature of the map 630 allows visual inspection of the network entities affected by a particular breach, and provides drill down capability via expansion buttons 618.

Those skilled in the art should readily appreciate that the programs and methods for investigating policy breaches as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for investigating policy breaches has been particularly shown and described with references to embodiments thereof, it will be understood by those skilled in the art that various changes in form and details may be made therein without departing from the scope of the invention encompassed by the appended claims.

What is claimed is:

1. A method of assessing application services compliance with network policies comprising:
   identifying a set of rules, each of the rules defining a desired state of the application services in an information network, wherein a plurality of rules define a policy and the policy includes a plurality of rules that identify network objects, a scope of the rule identifying which network objects it applies to, and a condition to test for satisfaction of the rule;
   performing discovery on applications configured in a network environment, the applications coupled to services executing on hosts in the network environment, the discovery identifying configuration and topological data applicable to the rules, performing discovery on applications configured in the network environment further comprising:
      invoking a host probe to query a host about configuration data; and
      performing passive listening on hosts, passive listening including observing the communication flow between the hosts, wherein the configuration and topological data is state information including attributes having values, the attributes indicative of adherence to a desired state based on the values matching an expected value for a desired state reflected in the corresponding rule;
   identifying dependencies between applications and services by determining consumers of the services dependent upon the services to serve the applications;
   receiving notifications indicative of the discovered configuration and topological data, the notifications reflecting modification of a particular value of a network state of an application service;
   comparing the received modified value with a desired intended value specified in a corresponding rule; and
   identifying a rule breach, the breach indicative of the network state misaligned with a rule, by comparing a received modified value with the value corresponding to the desired state, identifying the rule breach further comprising:
      identifying at least one of a violation or a vulnerability, a violation indicating a deviant state in the corresponding rule, a vulnerability indicating a rule potentially violating a value specified in a desired state in the corresponding rule;
      identifying the policy to which the rule belongs;
      identifying other breaches of rules in the identified policy to which the originally breached rule belongs; and
      assessing the cumulative rule breaches of rules in a policy to compute if a policy violation had occurred.

2. The method of claim 1 wherein the services execute on hosts responsive to the applications, the applications defining consumers of the services, each of the services servicing at least one application, further comprising:
   identifying application services paths defined by the dependencies employed by the applications for invoking the services, the application services paths including hosts and consumers of the services;
   identifying dependencies, the dependencies including direct and indirect consumers, that access the services servicing the application on the hosts responsible for hosting the application; and
   computing a compliance state on the hosts resulting from the invoked services, the compliance state indicative of adherence to the rules, further including identifying consumers of services at hosts from the identified application services paths and computed loads providing a plurality of services to multiple applications.

3. The method of claim 2 wherein the applications support user functions such that a compliance state indicating substantial rule violations results in reduced host performance on behalf of users, further comprising:
   identifying indirect consumers based on the dependencies; and
   traversing the breaches to identify an underlying condition causing the slowdown.

4. The method of claim 1, further comprising:
   identifying a set of related breaches corresponding to a particular breach, the related breaches based on rules applicable to a network entity causing the particular breach;
   presenting the identified set of related breaches to an operator;
   receiving a selection of a related breach in the identified set;
   presenting a set of related breaches, the related breaches affecting a common application services path or network entity; and
   traversing the identified set of rule breaches in an iterative manner to identify conditions underlying the set of related breaches.

5. The method of claim 4 wherein the rules further define a condition testing an intended state, further comprising:
   identifying a breached rule;
   determining the condition of the rule triggering the breach; and
   testing the condition with respect to other rules affected by the same condition to identify the set of related breaches.

6. The method of claim 1 wherein the applications couple to the services via links, further comprising:
   identifying the links to a particular service;
   analyzing the notifications pertaining to the particular service; and
   computing a condition common to a plurality of the notifications as a cause of the breach.

7. The method of claim 6 wherein the links further comprise physical links, virtual links, and logical links, further comprising:

enumerating a set of logical links and virtual links via an abstraction model applied to the physical links;

computing an application services path defined by the logical links and virtual links;

identifying at least one physical link underlying the application services path;

assessing rules pertaining to the application services path; and assessing rules pertaining to the identified physical link to determine breaches affecting the logical and virtual links.

8. A policy server operable to assess application compliance with network policies comprising:

a repository for storing an identified a set of rules, each of the rules defining a desired state of the network, wherein a plurality of rules define a policy and the policy includes a plurality of rules that identify network objects, a scope of the rule identifying which network objects it applies to, and a condition to test for satisfaction of the rule;

a discoverer for performing discovery on applications configured in a network environment, the applications coupled to services executing on hosts in the network environment, the discovery identifying configuration and topological data applicable to the rules, the discoverer further operable to identify dependencies between applications and services by determining consumers of the services dependent upon the services to serve the applications, invoke a host probe to query a host about configuration data and perform passive listening on hosts including observing the communication flow between the hosts;

an interface to the network for receiving notifications indicative of the discovered configuration and topological data, the notifications reflecting modification of a particular value of a network state; and a compliance engine for comparing the received modified value with a desired intended value specified in a corresponding rule, the compliance engine further operable for identifying a rule breach, the breach indicative of a network state misaligned with a rule, by comparing a received modified value with the value corresponding to the desired state, the configuration and topological data being state information including attributes having values, the attributes indicative of adherence to a desired state based on the values matching an expected value for a desired state reflected in the corresponding rule, wherein the compliance engine is further operable to identify a rule breach by identifying at least one of a violation or a vulnerability, a violation indicating a deviant state in the corresponding rule, a vulnerability indicating a rule potentially violating a value specified in a desired state in the corresponding rule, identifying the policy to which the rule belongs, identifying other breaches of rules in the identified policy to which the originally breached rule belongs, and assessing the cumulative rule breaches of rules in a policy to compute if a policy violation has occurred.

9. The server of claim 8 wherein the services execute on hosts responsive to the applications, the applications defining consumers of the services, each of the services servicing at least one application, further comprising:

identifying application services paths defined by the dependencies employed by the applications for invoking the services, the application services paths including hosts and consumers of the services;

computing a load on the hosts resulting from the invoked services; and identifying consumers of services at hosts from the identified paths and computed loads providing a plurality of services to multiple applications.

10. The server of claim 9 wherein the applications support user functions such that an application slowdown results in reduced throughput on behalf of users, the discoverer further operable to:

identify indirect consumers based on the dependencies; and traverse the breaches to identify an underlying condition causing the slowdown.

11. The server of claim 8 wherein the compliance engine is further operable to:

identify a set of related breaches corresponding to a particular breach, the related breaches based on rules applicable to a network entity causing the particular breach;

present the identified set of related breaches to an operator;

receive a selection of a related breach in the identified set;

present a set of related breaches, the related breaches affecting a common path or network entity; and traverse the identified rule breaches in an iterative manner to identify conditions underlying the set of related breaches.

12. The server of claim 11 wherein the rules further define a condition testing an intended state, further comprising:

identifying a breached rule;

determining the condition of the rule triggering the breach; and testing the condition with respect to other rules affected by the same condition to identify the set of related breaches.

13. The server of claim 8 wherein the applications couple to the services via links, further comprising:

identifying the links to a particular service;

identifying the direct and indirect consumers (dependencies) to a particular service residing on a host;

analyzing the notifications pertaining to the particular service; and computing a condition common to a plurality of the notifications as a cause of the breach.

14. The server of claim 13 wherein the links further comprise physical links, virtual links, and logical links, further comprising:

enumerating a set of logical links via an abstraction model applied to the physical links;

computing an application services path defined by the logical links and virtual links;

identifying at least one physical link underlying the path;

assessing rules pertaining to the application services path; and assessing rules pertaining to the identified physical link to determine breaches affecting the logical link.

15. A computer program product having computer program code stored on a non-transitory computer readable storage medium, the computer program code embodied as encoded instructions on the storage medium that, when executed by a processor, causes a computer to assess application compliance with network policies, the computer program code comprising:

computer program code for identifying a set of rules, each of the rules defining a desired state of the network, wherein a plurality of rules define a policy and the policy includes a plurality of rules that identify network objects, a scope of the rule identifying which network objects it applies to, and a condition to test for satisfaction of the rule;

computer program code for performing discovery on applications configured in a network environment, the applications coupled to services executing on hosts in the network environment, the discovery identifying configuration and topological data applicable to the rules, computer program code for performing discovery on applications configured in the network environment further comprising:
  computer program code for invoking a host probe to query a host about configuration data; and
  computer program code for performing passive listening on hosts, passive listening including observing the communication flow between the hosts, wherein the configuration and topological data is state information including attributes having values, the attributes indicative of adherence to a desired state based on the values matching an expected value for a desired state reflected in the corresponding rule;
computer program code for identifying dependencies between applications and services by determining consumers of the services dependent upon the services to serve the applications;
computer program code for receiving notifications indicative of the discovered configuration data, the notifications reflecting modification of a particular value of a network state;
computer program code for comparing the received modified value with a desired intended value specified in a corresponding rule; and
computer program code for identifying a rule breach, the breach indicative of a network state misaligned with a rule, by comparing a received modified value with the value corresponding to the desired state, the configuration data being state information including attributes having values, the attributes indicative of adherence to a desired state based on the values matching an expected value for a desired state reflected in the corresponding rule, computer program code for identifying the rule breach further comprising:
  computer program code for identifying at least one of a violation or a vulnerability, a violation indicating a deviant state in the corresponding rule, a vulnerability indicating a rule potentially violating a value specified in a desired state in the corresponding rule;
  computer program code for identifying the policy to which the rule belongs;
  computer program code for identifying other breaches of rules in the identified policy to which the originally breached rule belongs; and
  computer program code for assessing the cumulative rule breaches of rules in a policy to compute if a policy violation has occurred.

* * * * *